United States Patent Office 3,317,429
Patented May 2, 1967

3,317,429
ANTIOXIDATION ADDITIVES
Joseph Cekada, Jr., Midland, and John W. Van Dyke, Freeland, Mich., assignors to Dow Corning Corporation, Midland, Mich., a corporation of Michigan
No Drawing. Filed June 22, 1964, Ser. No. 377,118
10 Claims. (Cl. 252—78)

This invention relates to new, heat-stable and oxidation-resistant fluids which are suitable for high-temperature, high-shear uses such as in hydraulically driven machinery or in cooling systems.

The compositions of this invention are heat-stabilized fluids consisting essentially of (1) from 95 to 99.9 weight percent of a fluid selected from the group consisting of oxidation-resistant polyester fluids, and siloxane fluids of the formula $[R_nSiO_{4-n/2}]_m$, where R is selected from the group consisting of hydrocarbon radicals free of aliphatic unsaturation and halohydrocarbon radicals free of aliphatic unsaturation, $n$ has a value of 1.8 to 3, and $m$ has a value of at least 2, (2) from 0.05 to 3 weight percent of an amine-containing antioxidant, and (3) from 0.05 to 3 weight percent of a compound selected from the group consisting of

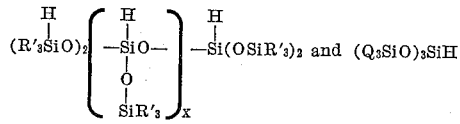

where Q is selected from the group consisting of lower alkyl and aryl radicals, at least one Q being aryl, $x$ is an integer of 0 to 4, and R' is selected from the group consisting of alkyl radicals of no more than 3 carbon atoms, alkoxy radicals of no more than 3 carbon atoms, the phenyl, tolyl, naphthyl, and vinyl radicals, and the

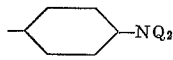

radical where Q is selected from the group consisting of lower alkyl and aryl radicals, the ratio of (2) to (3) being from 1:2 to 2:1.

Q can be any lower alkyl or aryl radical such as methyl, ethyl, propyl, isobutyl, hexyl, phenyl, tolyl, benzyl, or naphthyl.

R can be any hydrocarbon radical, free of aliphatic unsaturation, such as methyl, ethyl, isopropyl, hexyl, decyl, octadecyl, cyclohexyl, phenyl, benzyl, tolyl, or naphthyl. R can also be any halohydrocarbon radical free of aliphatic unsaturation such as chloromethyl, 3,3,3-trifluoropropyl, 4-bromohexyl, 3,8,10-trifluorooctadecyl, chlorocyclohexyl, chlorophenyl, or α,α,α-trifluorotolyl.

R' is as described above; the included alkyl radicals are the methyl, ethyl, n-propyl and isopropyl radicals; the included alkoxy radicals are the methoxy, ethoxy, n-propoxy and isopropoxy radicals.

Ingredient (2) consists of known stabilizers for fluids, but the combination of ingredients (2) and (3) gives superior results over ingredient (2) alone. The combined ingredients inhibit the formation of sludge, which is often a disadvantage in the use of ingredient (2) alone, and the combined ingredients generally impart greater viscosity stability and oxidative stability.

Ingredient (1) can be any fluid siloxane as above defined, e.g. tetramethyldiphenyldisiloxane,

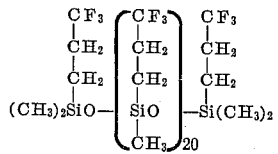

tetrakis(2-methylhexyl)tetramethylcyclotetrasiloxane, dimethylpolysiloxane, chlorophenylmethylpolysiloxane,

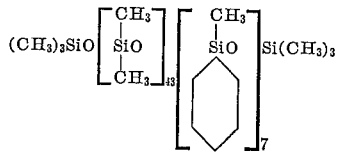

ethylmethylpolysiloxane, and ditolyltetrapropylcyclotrisiloxane.

The preferred species are dimethylpolysiloxane, 3,3,3-trifluoropropylmethylpolysiloxane, and copolymers of dimethyl and phenylmethylsiloxane.

Ingredient (1) can also be any oxidation-resistant fluid polyester, i.e. (a) esters of alkanoic acids and of polyhydric alcohols containing at least two methylol radicals, bonded to a quaternary carbon atom and (b) esters of tertiary alkyl carbinols and dicarboxylic acids.

The alkanoic acids of (a) must have at least 5 carbon atoms and preferably from 5 to 8 carbon atoms. Although the straight-chained alkanoic acids are preferred, the branched alkanoic acids can also be used. Examples of suitable alkanoic acids are pentanoic, hexanoic, heptanoic and octanoic and 2,3-dimethylpentanoic acids. The polyhydric alcohols can also be esterified with a mixture of alkanoic acids.

The polyhydric alcohol of (a) contains at least two methylol groups on a quaternary carbon atom and can contain as many as four methylol groups on a quaternary carbon atom. The term "quaternary carbon atom" means that this carbon atom is bonded to four other carbon atoms. Thus, the carbon atom beta to the hydroxyl radical in these alcohols is not bonded to any hydrogen atoms. Esters of such alcohols have a higher resistance to oxidation than those that have a hydrogen atom on the carbon atom which is beta to the hydroxyl radical. Other examples of suitable polyhydric alcohols are 1,1,1-trimethylolpropane, 1,1,1-trimethylolethane, neopentylglycol, 2-butyl-2-ethyl-1,3-propanediol, and 2,2,4-trimethyl-1,3-pentanediol. The preferred esters are the triesters of trimethylolpropane containing a quaternary carbon atom and alkanoic acids of 5 to 8 carbon atoms. The preferred species is the triheptanoate of 1,1,1-trimethylolpropane.

These esters are prepared by the reaction of the polyhydric alcohol with a slight excess of alkanoic acid. Although it is not necessary to use a catalyst, a suitable catalyst, such as p-toluene sulfonic acid, benzene sulfonic acid, zinc and lead salts can be employed. This reaction is preferably conducted at a temperature between 180° and 240° C. for a period between 6 and 14 hours. Water is eliminated by evaporation during the course of the reaction, preferably in the presence of an azeotropic agent, such as a fluid hydrocarbon.

The tertiary alkyl carbinols of (b) have a methylol radical on a quaternary carbon atom. Hence, there are no hydrogen atoms on the carbon atoms beta to the hydroxyl radical. Preferably the carbinol has from 5 to 12 inclusive carbon atoms. Examples of such carbinols are 2,2,4-trimethyl-1-pentanol, and 1-methylcyclohexylmethanol. Preferably the dicarboxylic acid of (b) has from 4 to 12 carbon atoms. Examples of suitable dicarboxylic acids are glutaric, adipic, suberic and sebacic acids. Sebacic and adipic acids are preferred. Specific examples of such esters are bis-(2,2,4-trimethylpentyl) sebacate, bis(1-methylcyclohexylmethyl)sebacate and bis-(1-methylcyclohexylmethyl)adipate. Methods for preparing these esters are described in "High-temperature Lubricating Fluids," Blake, Edwards, Hammann, Reichard, Wright Air Development Command TR 54–532 Pt. 2 (January 1956).

By "fluid" it is meant that the material is fluid at the anticipated temperature of operation, which may be higher than room temperature.

Ingredient (2) can be any conventional amine-containing antioxidant such as phenothiazine, phenyl-beta-naphthylamine, n-ethyl-1-naphthylamine, 1-naphthylamine, and dioctyldiphenylamine. The preferred antioxidant is phenyl-alpha-naphthylamine.

Ingredient (3) is as defined above, e.g.

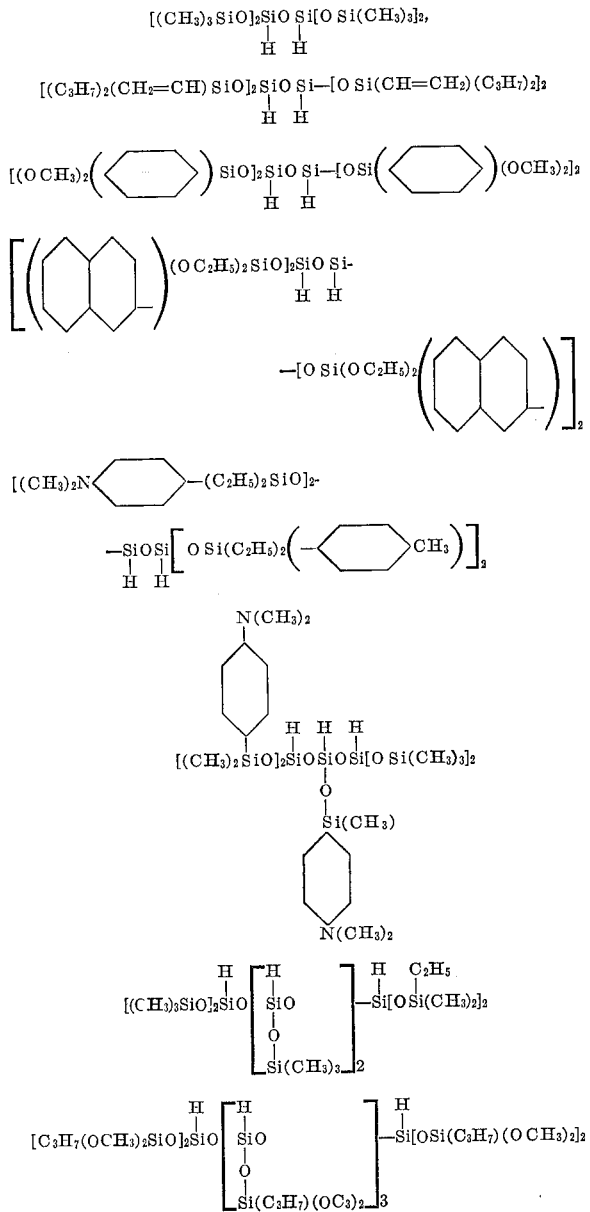

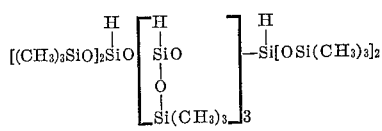

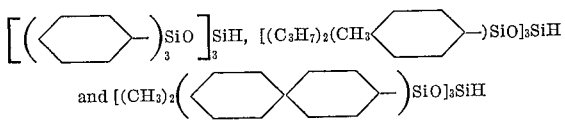

Th preferred ingredient (3) has the formula

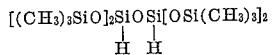

The compositions of this invention are made by simply mixing ingredients (1), (2), and (3) in proper proportions. It is preferred for ingredient (1) to be present in the amount of 97.0 to 98.8 weight percent; ingredient (2) to be present in the amount of 0.6 to 1.5 weight percent; and ingredient (3) to be present in the amount of 0.6 to 1.5 weight percent.

The stability of the compositions of this invention is further improved, when ingredient (1) is a silicone, by either or both blowing air through the composition for at least ½ hour at elevated temperature and contacting the composition with at least 0.1 weight percent, based on the weight of the composition, of aluminum or copper.

Silicone fluids have a typical decomposition pattern on heating. First the viscosity falls; then it rises to gel point. The additives of this invention cause silicone fluids to undergo a smaller viscosity decrease in the first stages of decomposition, and the gel time is also increased.

The following examples are illustrative only and should not be construed as limiting the invention which is properly delineated in the appended claims.

Example 1

0.2 gram of phenyl-alpha-naphthylamine and and 0.2 gram of

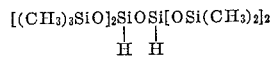

were dissolved in 20 grams of Celanese trimethylolpropane ester

where R' is an alkyl radical in the range of hexyl to octyl).

The 20 gram mixture was placed in a 1″ x 18″ test tube and immersed in a heating bath controlled at 425° F. The mixture had an original viscosity at 210° F. of 3.78. Air was bubbled through the fluid at 8 liters per hour for the various periods of testing. At the end of the testing, the tube was removed and the contents analyzed for acid number, viscosity at 210° F., and sludging. The results follow, compared with other compositions which were tested in a similar manner:

| Composition | Test time (hr.) | Visc. at 210° F. (cs.) | Acid No. | Remarks |
|---|---|---|---|---|
| The above composition | 24 | 3.64 | 0.56 | No solids. |
|  | 36 | 3.77 | 0.56 | Do. |
| Celanese T.M.P. ester with 1% $\left( \frac{[(CH_3)_3SiO]_2Si}{H} \right)_2 O$ | 24 | 25.2 | 12.1 | Do. |
| Celanese T.M.P. ester without additive | 24 | 15.4 | 19.6 | Solids in the earlier stages of oxidation. |

When Celanese T.M.P. ester containing 1 percent phenyl-alpha-naphthylamine was heat-tested in a similar manner, solids formed in the fluid composition, and the acid number and viscosity were greater than that of the phenyl-alpha-naphthylamine-silicone composition described above after a similar time of heating.

Example 2

To 200 grams of dimethylpolysiloxane fluid having a viscosity at 25° C. of 6,000 cs. was added 2 grams of phenyl-alpha-naphthylamine and 2 grams of

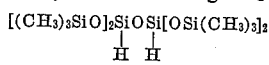

Four samples of this were air blown at 290° C. for a period of ½ hour for sample (a) and 2 hours for samples (b), (c) and (d). To same (c) was added some copper wire, and to sample (d) was added some aluminum. These samples were placed in an air circulating oven and heated at 250° C. The viscosity, compared with the time of heating, is shown below:

| | Days at 250° C. | | | | | | |
|---|---|---|---|---|---|---|---|
| | 0 | 1 | 2 | 4 | 11 | 13 | 19 |
| Viscosity as a percent of original viscosity: | | | | | | | |
| (a) | 100 | 92.8 | 80.8 | 80.6 | 86.7 | 107.3 | Gel |
| (b) | 100 | 90.4 | 90.8 | 90.4 | 125.0 | 158.5 | Gel |
| (c) | 100 | 83.7 | 81.0 | 81.4 | 118.5 | 123.0 | 194.0 |
| (d) | 100 | 86.2 | 83.7 | 82.3 | 99.5 | 103.5 | 145.0 |

Dimethylpolysiloxane fluid alone, on subjection to the same test, performed as follows:

| | Days at 250° C. | | | | |
|---|---|---|---|---|---|
| | 0 | 1 | 2 | 4 | 5 |
| Viscosity as a percent of original viscosity | 100 | 75.6 | 66.2 | 168.5 | Gel |

The same dimethylpolysiloxane was mixed with 1 weight percent of another additive (see below) and subjected to the above test. The results were:

IRON OCTOATE ADDITIVE

| | Days at 250° C. | | | | | | | |
|---|---|---|---|---|---|---|---|---|
| | 0 | 1 | 2 | 4 | 5 | 7 | 11 | 13 |
| Viscosity as a percent of original viscosity | 100 | 85.0 | 80.8 | 86.5 | 96.0 | 116.4 | 169.5 | 224 |

N,N′-DIPHENYLPARAPHENYLENEDIAMINE ADDITIVE
[The comparison being air-blown for 2 hours at 290° C.]

| | Days at 250° C. | | | | | | | |
|---|---|---|---|---|---|---|---|---|
| | 0 | 1 | 2 | 4 | 5 | 7 | 8 | 11 |
| Viscosity as a percent of original viscosity | 100 | 81.7 | 74.5 | 67.3 | 63.4 | 137 | 633 | Gel |

Example 3

To a sample of dimethylpolysiloxane was added 1 weight percent of

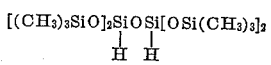

This was placed in an air-circulating oven and heated at 250° C. The viscosity, compared with the time of heating, is shown below.

| | Days at 250° C. | | | | | |
|---|---|---|---|---|---|---|
| | 0 | ⅙ | ½ | 1 | 4 | 6 |
| Viscosity as a percent of original viscosity | 100 | 94.1 | 87.8 | 81.2 | 455 | Gel |

Example 4

To samples of Celanese ester fluid

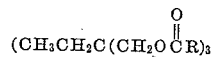

where R is a n-alkyl radical of 7 to 9 carbon atoms) were added 1 weight percent of phenyl-alpha-naphthylamine and 1 weight percent of one of the following additives. The initial viscosity was 3.72 cs. The initial acid number was 0.140. The samples were then heated at 425° F. The viscosity and acid number as a function of the time of heating is recorded below:

| Additive | Acid Number | | | | Viscosity at 210° F. (cs.) | | | |
|---|---|---|---|---|---|---|---|---|
| | 24 hrs. | 30 hrs. | 36 hrs. | 48 hrs. | 24 hrs. | 30 hrs. | 36 hrs. | 48 hrs. |
| [(CH₃)₃SiO]₂SiO{SiO(O Si(CH₃)₃)₂}₂—Si[OSi(CH₃)₃]₂ with H's | 0.56 | 0.84 | 1.40 | 27.6 | 3.90 | 3.95 | 4.06 | 10.08 |
| (C₆H₅(CH₃)₂SiO)₃ SiH | 0.56 | 15.4 | 25.2 | 28.0 | 3.77 | 5.60 | 7.55 | 9.85 |
| None (the amine additive alone) | 22.3 | | | 26.7 | 7.8 | | | 29.1 |
| None (but 2 weight percent phenyl-alpha-naphthylamine used) | 7.2 | | | | 4.85 | Solids formed at 24 hrs. of heating. | | |

Example 5

When 0.8 weight percent of phenyl-alpha-naphthylamine and 1 weight percent of

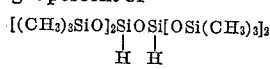

is added to dimethylpolysiloxane fluid, the percentages being based on the weight of the dimethylpolysiloxane, a fluid is formed which is suitable for use as a viscous coupling fluid in fan clutches such as are used in automobiles with air conditioning, since the fluid has high oxidative stability and shear resistance.

The oxidative stability is increased when such fluid is used in an aluminum container.

*Example 6*

When the following fluid compositions are subjected to high temperatures, they exhibit heat and oxidative stability. Composition:

(a)

(1) 99.9 weight percent of

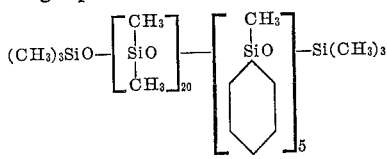

(2) 0.05 weight percent of phenothiazine,
(3) 0.05 weight percent of

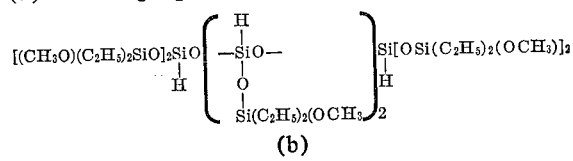

(b)

(1) 99 weight percent of tetrabutyltetramethylcyclotetrasiloxane,
(2) 0.6 weight percent of dioctyldiphenylamine,
(3) 0.4 weight percent of

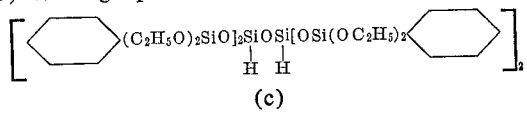

(c)

(1) 95 weight percent of

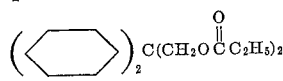

(2) 2 weight percent of n-ethyl-1-naphthylamine,
(3) 3 weight percent of

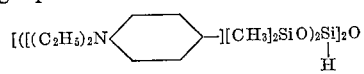

(d)

(1) 96 weight percent of

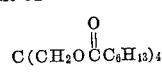

(2) 2 weight percent of 1-naphthylamine.
(3) 1 weight percent of

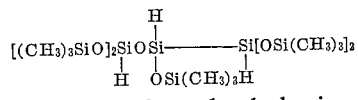

(4) 1 weight percent of powdered aluminum based on the weight of (1), (2), and (3).

(e)

(1) 98 weight percent of

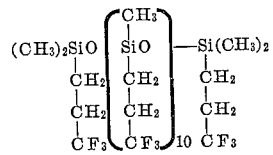

(2) 1.1 weight percent of N,N'-diphenylparaphenylene diamine,
(3) 0.9 weight percent of

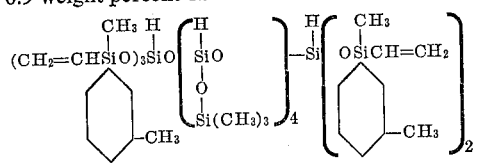

(f)

(1) 97 weight percent of bis(2,2,4-trimethylpentanol) adipate,
(2) 1 weight percent of phenyl-alpha-naphthylamine,
(3) 2 weight percent of

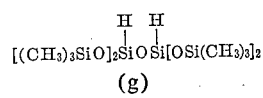

(g)

(1) 97.5 weight percent of neopentylglycol hexanoate,
(2) 1.5 weight percent of phenyl-alpha-naphthylamine,
(3) 1 weight percent of

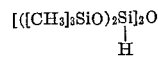

*Example 7*

To 98 parts by weight of a dimethylpolysiloxane fluid having a viscosity at 25° C. of 6,000 cs. was added 1 part of phenyl-alpha-naphthylamine and 1 part of

This composition was air-blown for 2 hours at 290° C.

Thin films of the composition were then placed in aluminum cups and heated at 250° C. The gel times for the films were from 143 to 159 hours.

The experiment was repeated, using identical compositions to the above that lacked one or the other of the additives. The composition that lacked the amine additive gelled in 2 hours. The composition that lacked the silicone additive gelled in 18 hours.

Pure dimethylpolysiloxane fluid having a viscosity at 25° C. of 6,000 cs. was filmed in an aluminum cup and heated at 250° C. The gel time was 3 hours.

That which is claimed is.

1. A heat-stabilized fluid consisting essentially of
   (1) from 95 to 99.9 weight percent of a fluid selected from the group consisting of oxidation-resistant esters of alkanoic acids having at least 5 carbon atoms and polyhydric alcohols containing at least two methylol radicals bonded to a quaternary carbon atom, esters of tertiary alkyl carbinols having a methylol radical on a quaternary carbon atom and having from 5 to 12 carbon atoms and dicarboxylic acids having from 4 to 12 carbon atoms, and siloxane fluids of the formula $[R_nSiO_{4-n/2}]_m$ where
      R is selected from the group consisting of hydrocarbon radicals free of aliphatic unsaturation and halohydrocarbon radicals free of aliphatic unsaturation,
      $n$ has a value of 1.8 to 3, and
      $m$ has a value of at least 2,
   (2) from 0.05 to 3 weight percent of an amine antioxidant selected from the group consisting of phenothiazine, phenylamine and naphthylamines, and
   (3) from 0.05 to 3 weight percent of a compound selected from the group consisting of

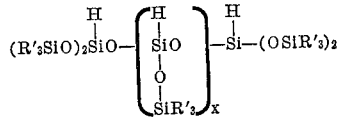

and $(Q_3SiO)_3SiH$ where
      Q is selected from the group consisting of lower alkyl and aryl radicals, at least one Q being aryl,
      $x$ is an integer of 0 to 4, and
      R' is selected from the group consisting of alkyl radicals of no more than 3 carbon atoms, alkoxy radicals of no more than 3 carbon atoms, the phenyl, tolyl, naphthyl, and vinyl radicals, and the

radical where Q is selected from the group consisting of lower alkyl and aryl radicals, the ratio of (2) to (3) being from 1:2 to 2:1.

2. The composition of claim 1 where (1) is a siloxane fluid of the formula $[R_nSiO_{4-n/2}]_m$, where
R is selected from the group consisting of hydrocarbon radicals free of aliphatic unsaturation and halohydrocarbon radicals free of aliphatic unsaturation,
n has a value of 1.8 to 3, and
m has a value of at least 2.

3. The composition of claim 1 where (1) is a triester of trimethylolpropane containing a quaternary carbon atom and an alkanoic acid of 5 to 8 carbon atoms.

4. The composition of claim 1 where (1) is 1,1,1-trimethylolpropane triheptanoate.

5. The composition of claim 1 where (1) is dimethylpolysiloxane.

6. The composition of claim 1 where (2) is phenyl-alpha-naphthylamine.

7. The composition of claim 1 where (3) is

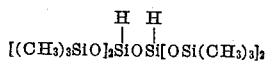

8. The composition of claim 1 where (3) is

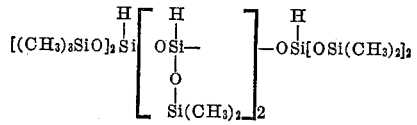

9. The composition of claim 1 where from 0.8 to 1.2 weight percent of (2) and 0.6 to 1.0 weight percent of (3) is used.

10. The composition of claim 1 where (1) is dimethylpolysiloxane, (2) is phenyl-alpha-naphthylamine, and (3) is

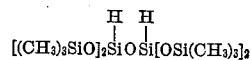

References Cited by the Examiner
UNITED STATES PATENTS

| | | | |
|---|---|---|---|
| 2,920,044 | 1/1960 | Daudt | 252—78 |
| 3,019,191 | 1/1961 | Furby et al. | 252—78 |
| 3,029,269 | 4/1962 | Abbott et al. | 260—448.8 |
| 3,218,256 | 11/1965 | Edwards et al. | 252—400 X |

LEON D. ROSDOL, *Primary Examiner.*

S. D. SCHWARTZ, *Assistant Examiner.*